(12) United States Patent
Moore et al.

(10) Patent No.: US 7,677,880 B2
(45) Date of Patent: Mar. 16, 2010

(54) APPARATUS FOR FORMING HAND-FORMED STYLE PATTY USING A PATTY-FORMING MACHINE

(75) Inventors: Chris Moore, Homer Glen, IL (US); Paul Taylor, Munster, IN (US)

(73) Assignee: Formax, Inc., Mokena, IL (US)

( * ) Notice: Subject to any disclaimer, the term of this patent is extended or adjusted under 35 U.S.C. 154(b) by 38 days.

(21) Appl. No.: 12/009,616

(22) Filed: Jan. 19, 2008

(65) Prior Publication Data
US 2008/0220116 A1 Sep. 11, 2008

Related U.S. Application Data

(60) Provisional application No. 60/881,878, filed on Jan. 23, 2007.

(51) Int. Cl.
*A23P 1/00* (2006.01)
*B30B 5/06* (2006.01)

(52) U.S. Cl. .................. 425/324.1; 425/371
(58) Field of Classification Search ............ 425/335, 425/371, 324.1; 426/513
See application file for complete search history.

(56) References Cited

U.S. PATENT DOCUMENTS

| | | | |
|---|---|---|---|
| 2,070,850 A | 2/1937 | Trabold | |
| 2,509,971 A | 5/1950 | Elsaesser | |
| 2,528,125 A | 10/1950 | Elsaesser | |
| 2,634,458 A | 4/1953 | Elsaesser | |
| 3,734,007 A | 5/1973 | Husen | |
| 3,887,964 A | 6/1975 | Richards et al. | |
| 4,035,982 A | 7/1977 | Paules | |
| 4,137,604 A * | 2/1979 | Sandberg et al. | 99/450.1 |
| 4,229,859 A | 10/1980 | Gagliardi, Jr. et al. | |
| 4,356,595 A | 11/1982 | Sandberg et al. | |
| 4,372,008 A | 2/1983 | Sandberg | |
| 4,467,497 A | 8/1984 | Peterson et al. | |
| 4,514,434 A | 4/1985 | Goldberger et al. | |
| 4,516,291 A | 5/1985 | Goldberger et al. | |
| 4,821,376 A | 4/1989 | Sandberg | |
| 4,996,743 A | 3/1991 | Janssen | |
| 5,037,350 A | 8/1991 | Richardson et al. | |
| 5,454,304 A * | 10/1995 | Bielfeldt | 100/43 |
| 5,809,745 A * | 9/1998 | Reinert | 53/447 |
| 5,811,146 A | 9/1998 | Marra et al. | |
| 6,537,054 B2 * | 3/2003 | Kitahama et al. | 425/224 |
| 6,702,966 B1 | 3/2004 | Suzuki et al. | |
| 7,070,676 B2 | 7/2006 | Churchland et al. | |
| 7,159,372 B2 | 1/2007 | Lindee et al. | |
| 2005/0072312 A1 | 4/2005 | Pasek et al. | |
| 2005/0092187 A1 | 5/2005 | Lamartino et al. | |

* cited by examiner

*Primary Examiner*—Maria Veronica D Ewald
(74) *Attorney, Agent, or Firm*—Erickson Law Group, PC

(57) ABSTRACT

A system includes a high speed reciprocating mold plate patty-forming machine and a downstream patty presser. The high speed patty forming machine provides patties at a high production speed onto an output conveyor portion. The patty presser includes an upper conveyor having an upper endless belt. The upper conveyor is located above the output conveyor, wherein facing belt surfaces of the upper and lower endless belts define a path between the upper and lower conveyors. The upper conveyor has a tilted section such that a first clearance at an input to the path is equal to or greater than a thickness of the patties and a second clearance at an outlet of the inlet length is less than a thickness of the patties at the input of the path. A shuttle conveyor is arranged at the output of the path and delivers patties to an indexing packaging machine.

14 Claims, 13 Drawing Sheets

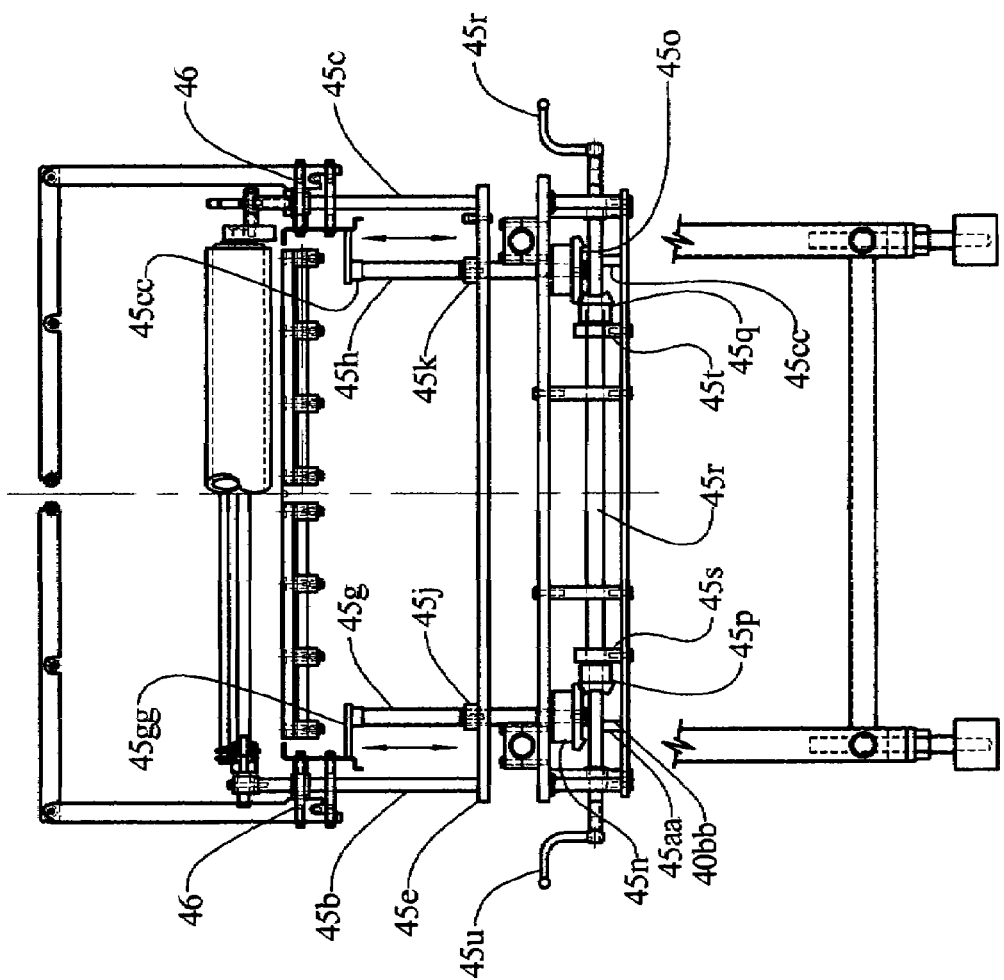

APPARATUS FOR FORMING HAND-FORMED STYLE PATTY USING A PATTY-FORMING MACHINE

This application claims the benefit of Provisional Application U.S. Ser. No. 60/881,878, filed Jan. 23, 2007.

BACKGROUND OF THE INVENTION

Use of pre-processed foods has created a demand for effective high-capacity automated food processing equipment. That demand is particularly evident with respect to hamburgers, molded steaks, fish cakes, and other molded food patties.

Food processors utilize high-speed molding machines, such as FORMAX®, MAXUM700®, F-6™, F-12™, F-19™, F-26™, or F-400™ reciprocating mold plate forming machine, available from Formax, Inc. of Mokena, Ill., U.S.A., for supplying patties to the fast food industry. High-speed molding machines are also described for example in U.S. Pat. Nos. 3,887,964; 4,372,008; 4,356,595; 4,821,376; 4,996,743, and published U.S. Patent Application 2005/0092187, U.S. Ser. No. 10/942,627 filed Sep. 16, 2004.

While this equipment has been highly successful in producing meat patties at high speed, equipment of the type described generally produces patties having a flat, circular or square shape with smooth upper and lower surfaces. Consumers may tend to associate these meat patties which have smooth upper and lower surfaces and smooth perimeters with fast food meat patties.

In a hand-formed meat patty, the perimeter of the patties and the upper and lower surfaces are not smooth. Consumers may recognize this patty as being of a hand made quality, such as would be served at home.

While it may be desirable to produce such a hand-formed patty, unlike hand-formed meat patties made at home, precise weight control of each patty is extremely important for mass produced patties.

U.S. Pat. No. 4,516,291 describes an apparatus for forming meat patties that have a precisely and accurately controlled weight but attempts to produce such patties to have a natural irregular shape. This patent describes a reciprocating mold plate patty-forming machine that includes a mold plate provided with cavities for molding pre-forms from which the finished patties are made.

After being knocked out of the mold cavity, the patty is flattened to reduce its thickness. Pressure rollers engage the top and bottom surfaces of the patty force the top and bottom surfaces toward one another as well as cause the edges of the patty to spread radially.

The pressing of the patty is described as done by passing the patty sequentially through two sets of rollers, with a 90 degree patty re-orienting step between the two sets of rollers to reduce the thickness in two successive stages.

According to this patent, after the flattening stages each patty has a different appearance. The finished patty is free from smooth molded surfaces produced by shaping or forming it with molding dies or the like.

The present inventors have recognized that a need exists for a patty-forming machine that produced patties at a high rate of production and also produced patties having a hand-formed patty appearance and cooking quality. The present inventors have recognized the need exists for such a patty-forming machine that was reliable and produced a patty with a appetizing appearance simulating a hand-formed patty.

SUMMARY OF THE INVENTION

The present invention provides a system for forming patties having a hand-formed appearance. The system includes a high speed patty-forming machine and a downstream patty presser.

The high speed patty forming machine is of the type that has a reciprocating mold plate with mold cavities. The mold plate reciprocates between a patty fill position wherein food product under pressure fills the cavities and a discharge position where a plurality of knockout cups displace the patties from the cavities downward onto an output conveyor portion.

The patty presser comprises an upper conveyor having an upper endless belt and a lower conveyor comprising a lower endless belt. The lower conveyor receives patties from the output conveyor portion. The upper conveyor is located above the lower conveyor, wherein facing belt surfaces of the upper and lower endless belts define a path between the upper and lower conveyors.

The upper and lower endless belts circulate in opposite directions. The upper conveyor has an inlet length of the facing belt surface of the upper endless belt being tilted such that a first clearance at an input to the path is equal to or greater than a thickness of the patties and a second clearance at an outlet of the inlet length is less than a thickness of the patties at the input of the path.

The inventive system can also include a shuttle conveyor arranged at the output of the path and an indexing packaging machine that at a filling station presents open packages to be filled. Once filled, the indexing packaging machine indexes the packages away from the filling station to and delivers new open packages to the filling station. The shuttle conveyor delivers patties to the filling station and deposits the patties into the open packages.

Preferably, the upper conveyor comprises a horizontal section from an end of the inlet length to the end of the path.

Preferably, the upper conveyor comprises a backing plate above the inlet length of the facing surface of the upper endless belt.

Preferably, the patty presser includes a first elevator mechanism, wherein the inlet length of the upper endless belt is adjustable in tilt by action of the first elevator.

Preferably, the patty presser includes a second elevator mechanism, wherein the clearance between the facing belt surfaces at an end of the path is adjustable by action of the second elevator mechanism.

The apparatus of the present invention provides patties at a high rate of production due to the high speed production capabilities of a reciprocating mold plate patty-forming machine as well as patties that have the appearance and cooking qualities of hand-formed patties.

Numerous other advantages and features of the present invention will be become readily apparent from the following detailed description of the invention and the embodiments thereof, and from the accompanying drawings.

BRIEF DESCRIPTION OF THE DRAWINGS

FIG. 5 is a fragmentary sectional view taken generally along line 5-5 of FIG. 3;

DETAILED DESCRIPTION OF THE PREFERRED EMBODIMENTS

Figure 1:
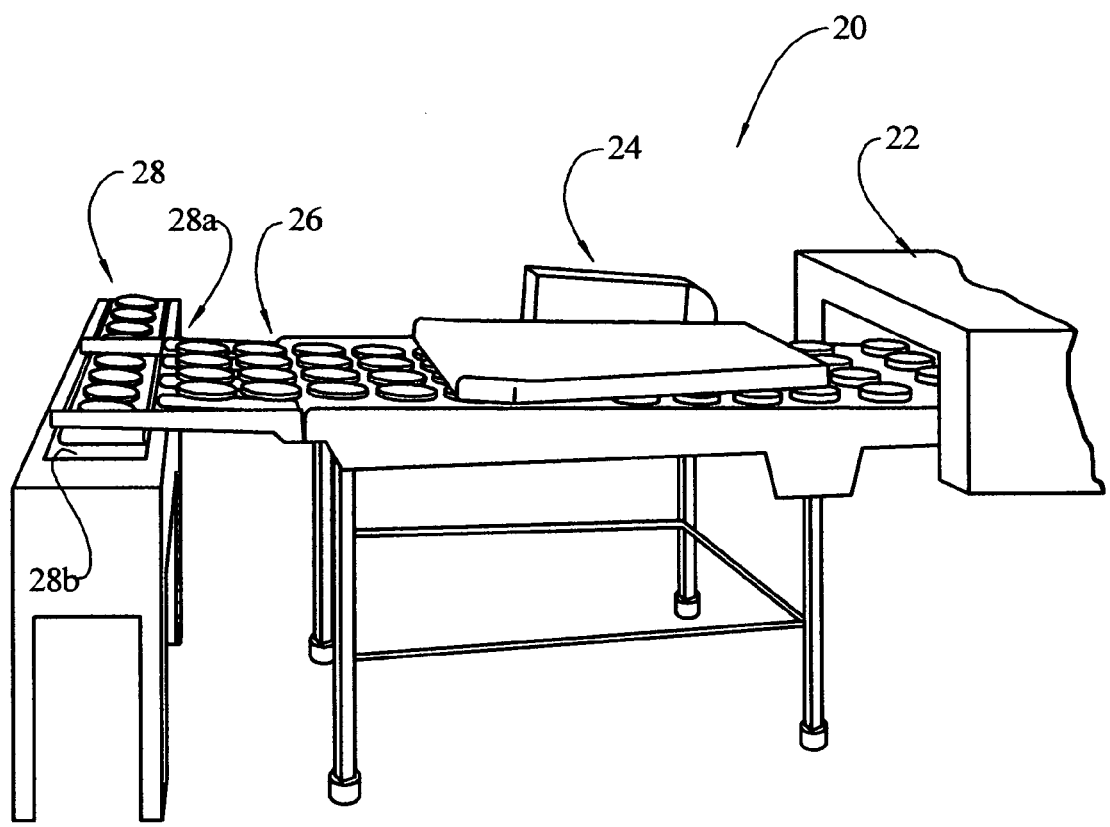
FIG. 1 is a diagrammatic perspective view of a patty forming, patty pressing and patty package loading system of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
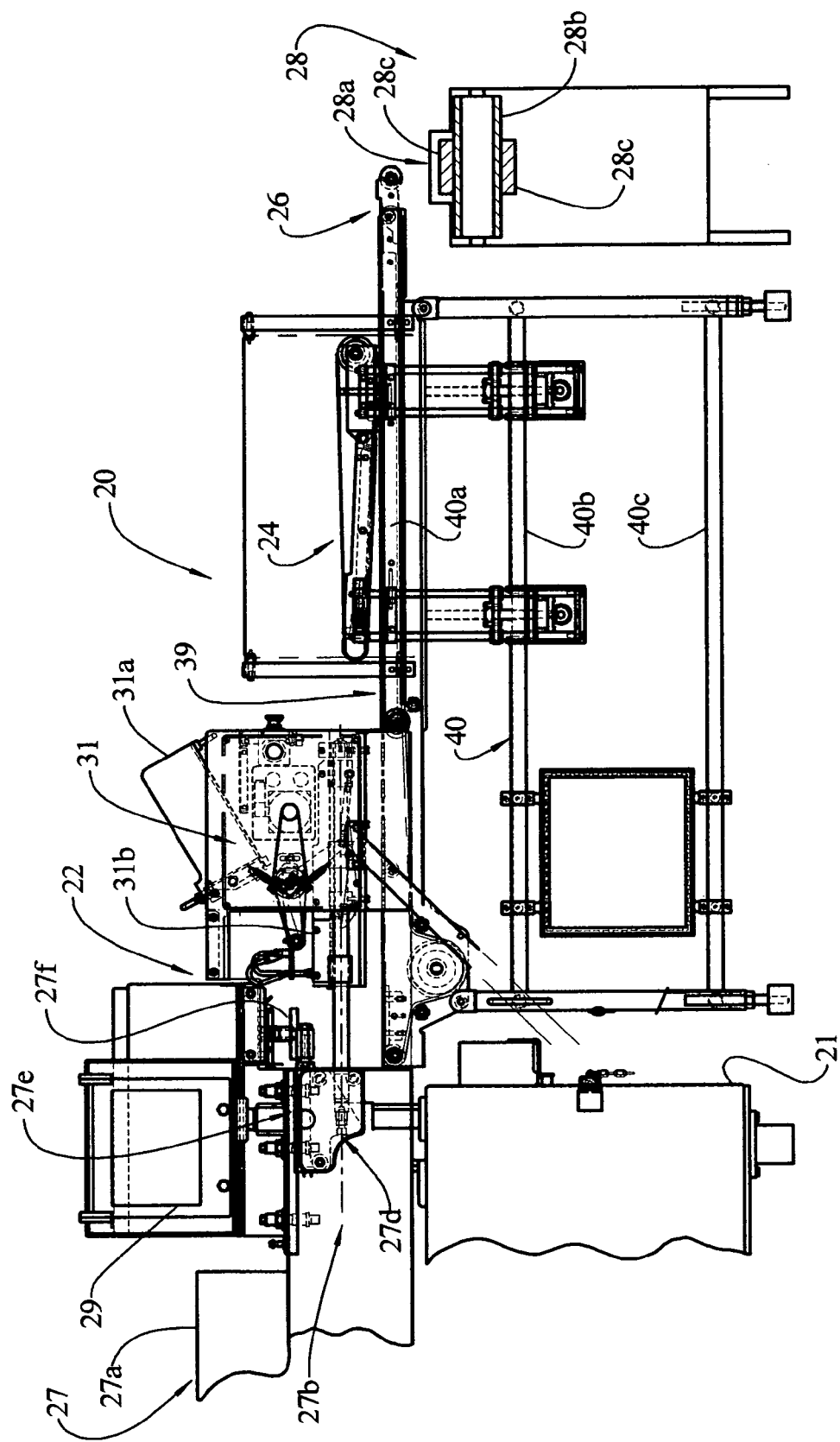
FIG. 2 is a more detailed side view of the system shown in FIG. 1 with some panels shown transparent to view underlying components.

FIGS. 1 and 2 illustrate a system 20 according to the invention. A high-speed food patty molding machine 22 is operatively associated with a pressing former 24, a shuttle conveyor 26, and an indexing packaging machine 28. The high-speed molding machine 26 can be a FORMAX® MAXUM700, F-6™, F-12™, F-19™, F-26™, F-26UL-TRA™ or F-400™ reciprocating mold plate forming machine, available from Formax, Inc. of Mokena, Ill., U.S.A., for supplying patties to the fast food industry. High-speed molding machines are also described for example in U.S. Pat. Nos. 3,887,964; 4,372,008; 4,356,595; 4,821,376; 4,996,743, and published U.S. Patent Application 2005/0092187, U.S. Ser. No. 10/942,627 filed Sep. 16, 2004, and U.S. Ser. No. 60/881,877, filed Jan. 23, 2007, all incorporated by reference.

The molding machine 22 includes a machine base 21 that supports the operating mechanism for machine 22 and can contain hydraulic actuating systems, electrical actuating systems, and most of the machine controls. The machine 22 includes a supply means 27 for supplying moldable food material, such as ground beef, fish, or the like, to the processing mechanisms of the machine.

A control panel 29, such as a touch screen control panel, is arranged on a forward end of the apparatus 22 and communicates with a machine controller.

As generally illustrated in FIG. 2 supply means 27 comprises a large food material storage hopper 27a that opens into the intake of a food pump system 27b. The food pump system 27b typically includes at least two food pumps that continuously, or intermittently under a pre-selected control scheme, pump food material, under pressure, into a valve manifold 27d that is flow-connected to a cyclically operated molding mechanism 27e.

In the operation of machine 22, a supply of ground beef or other moldable food material is deposited into hopper 27a from overhead. An automated refill device (not shown) can be used to refill the hopper when the supply of food product therein is depleted. The floor of hopper 27a at least partially closed by a conveyor belt of a conveyor (not shown). The belt includes a top surface for moving the food material longitudinally of the hopper 27a to a hopper forward end.

The food material is moved by supply means 27 into the intake of plunger pumps of pumping system 27b. The pumps of system 27b operate in overlapping alteration to each other; and at any given time when machine 22 is in operation, at least one of the pumps is forcing food material under pressure into the intake of manifold 27d.

The manifold 27d comprises a path for feeding the food material, still under relatively high pressure, into the molding mechanism 27e. Molding mechanism 27e operates on a cyclic basis, first sliding a multi-cavity mold plate into a receiving position over manifold 27d and then away from the manifold to a discharge position aligned with a series of knock out cups 27f. When the mold plate is at its discharge position, knock out cups plungers or cups 27f are driven downwardly discharging hamburgers or other molded patties from machine 22. Preferably a sheet interleaver machine 31 is arranged on the outlet of the forming machine 22. The sheet interleaver machine 31 is described in detail in U.S. Pat. No. 7,159,372, herein incorporated by reference. The machine 31 includes a supply of sheets 31a, a sheet shuttle 31b that is arranged to move in synchronism with the mold plate movement between an advanced position beneath the knockout cups and a retracted position. When in the retracted position a pivoting sheet placer 31c places a row of sheets on the shuttle. The shuttle then moves to the advanced position beneath the knockout cups and beneath the mold plate cavities filled with food patties. When the knockout cups are driven downward to displace the patties, the patties 35 are pushed onto the sheets 37, with the sheets underlying the patties.

The patties 35 and sheets 37 are pushed onto a top surface 39b of a circulating belt 39a of an output conveyor 39. The output conveyor 39 includes a supporting frame 40. The supporting frame includes an upper frame level 40a, an intermediate frame level 40b and a lower frame level 40c.

The patty presser 24 is shown in detail in FIGS. 3-9. The presser is carried by the frame 40 and is located above the output conveyor 39. Alternately, the presser could have a separate lower conveyor that receives patties from the output conveyor. The presser 24 includes an upper conveyor 41 that comprises an angular input section 41a and an output horizontal section 41b. The input section 41a is pivotable to the output section 41b about a shaft 43. An input end of the input section 41a can be adjusted in elevation by a first elevator mechanism 45. The entire output section 41b, and including the end of the input section 41a, can be adjusted in elevation by a second elevator 47. The elevators 45, 47 support the upper conveyor from the frame 40.

The elevator mechanisms 45, 47 are substantially identical in configuration, so that only the elevator mechanism 45 will be described.

The elevator mechanism 45 includes four columns 45a, 45b, 45c, 45d arranged in a grid pattern. A bracket plate 45e is fastened to the lower ends of the columns 45a, 45b, 45c, 45d.

Figure 3:
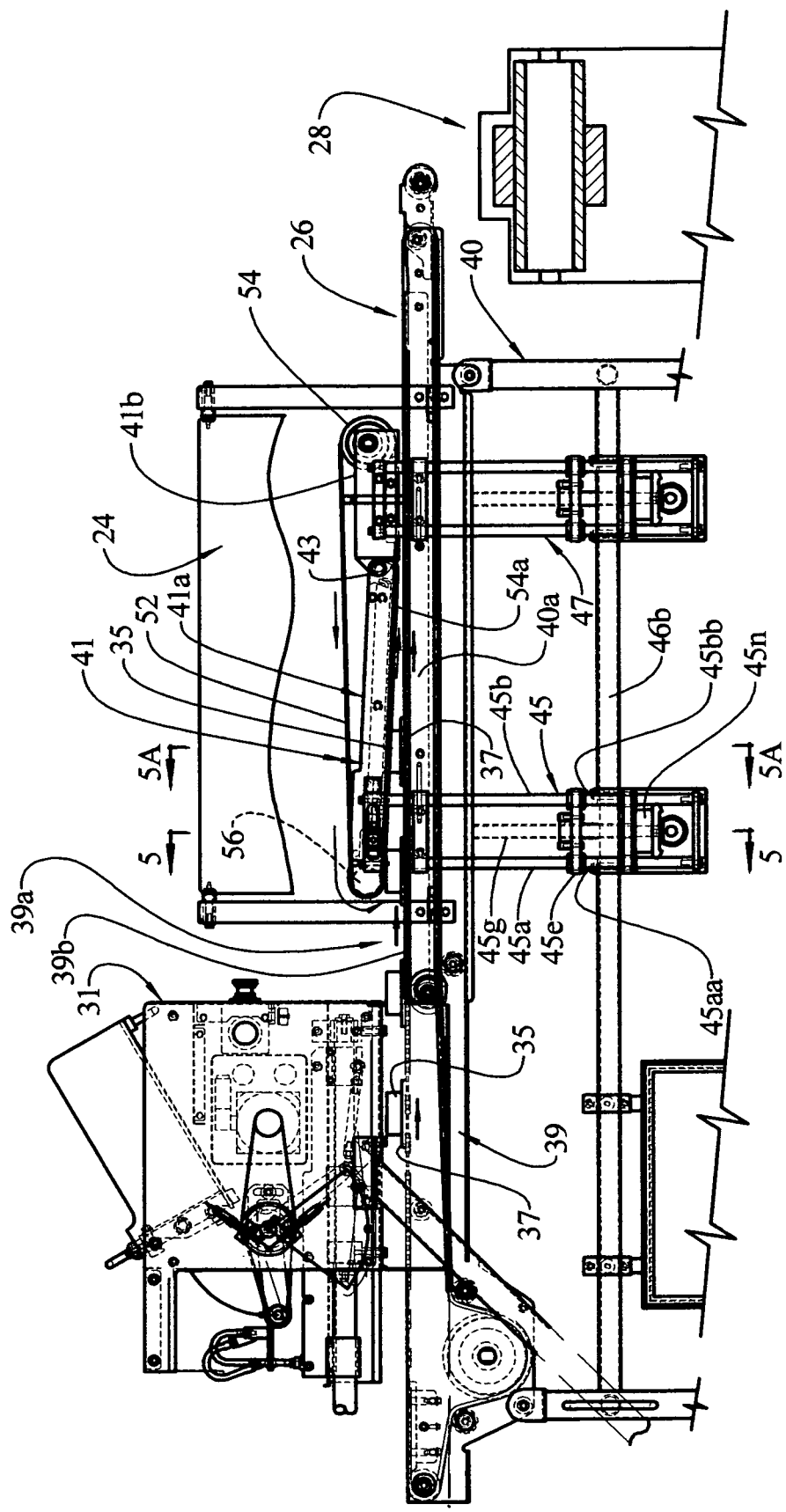
FIG. 3 is an enlarged, fragmentary side view taken from FIG. 2.
Figure 5A:
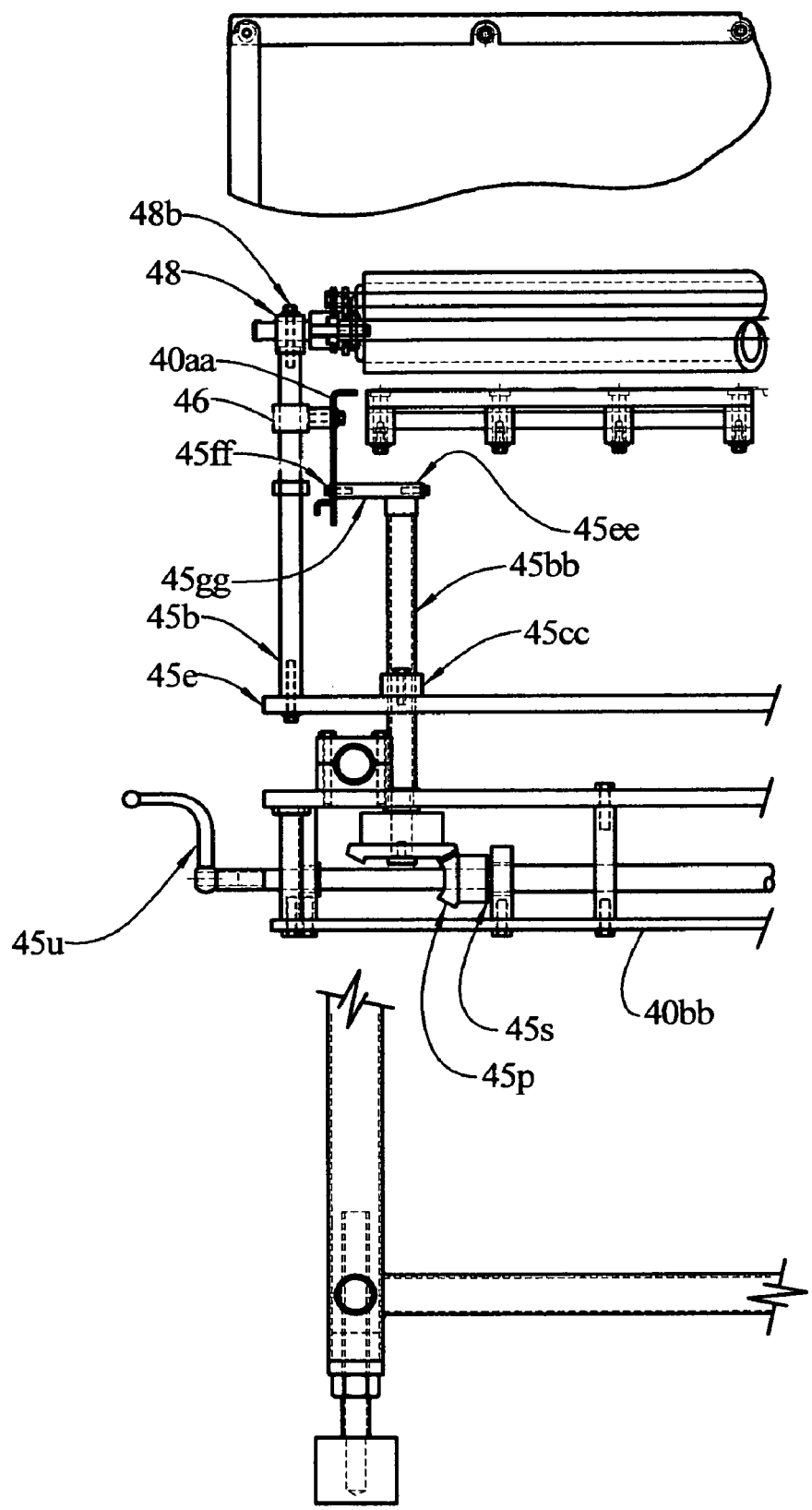
FIG. 5A is a fragmentary sectional view taken generally along line 5A-5A of FIG. 3.
Figure 6:
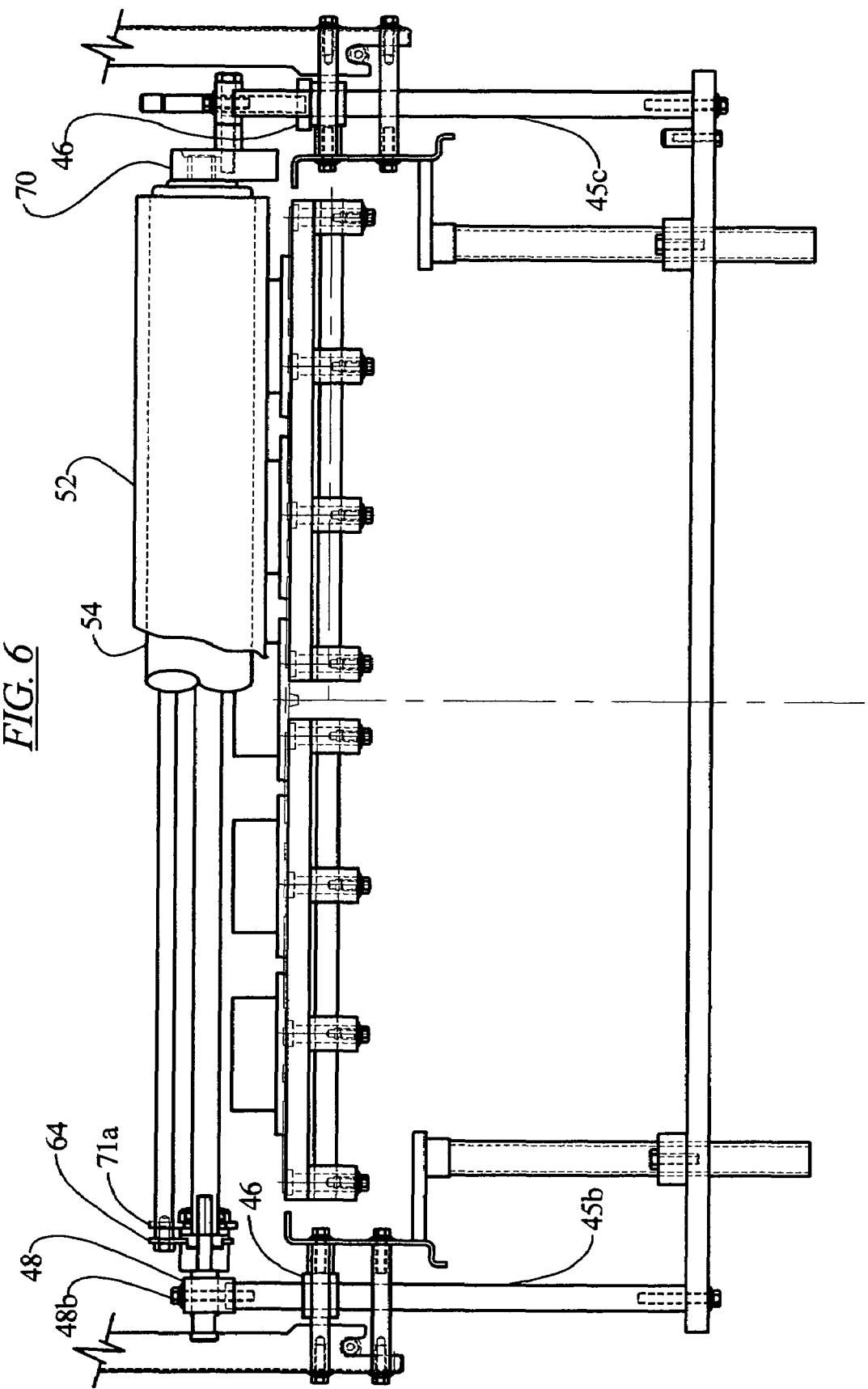
FIG. 6 is an enlarged, fragmentary end view taken from FIG. 5.
Figure 7:
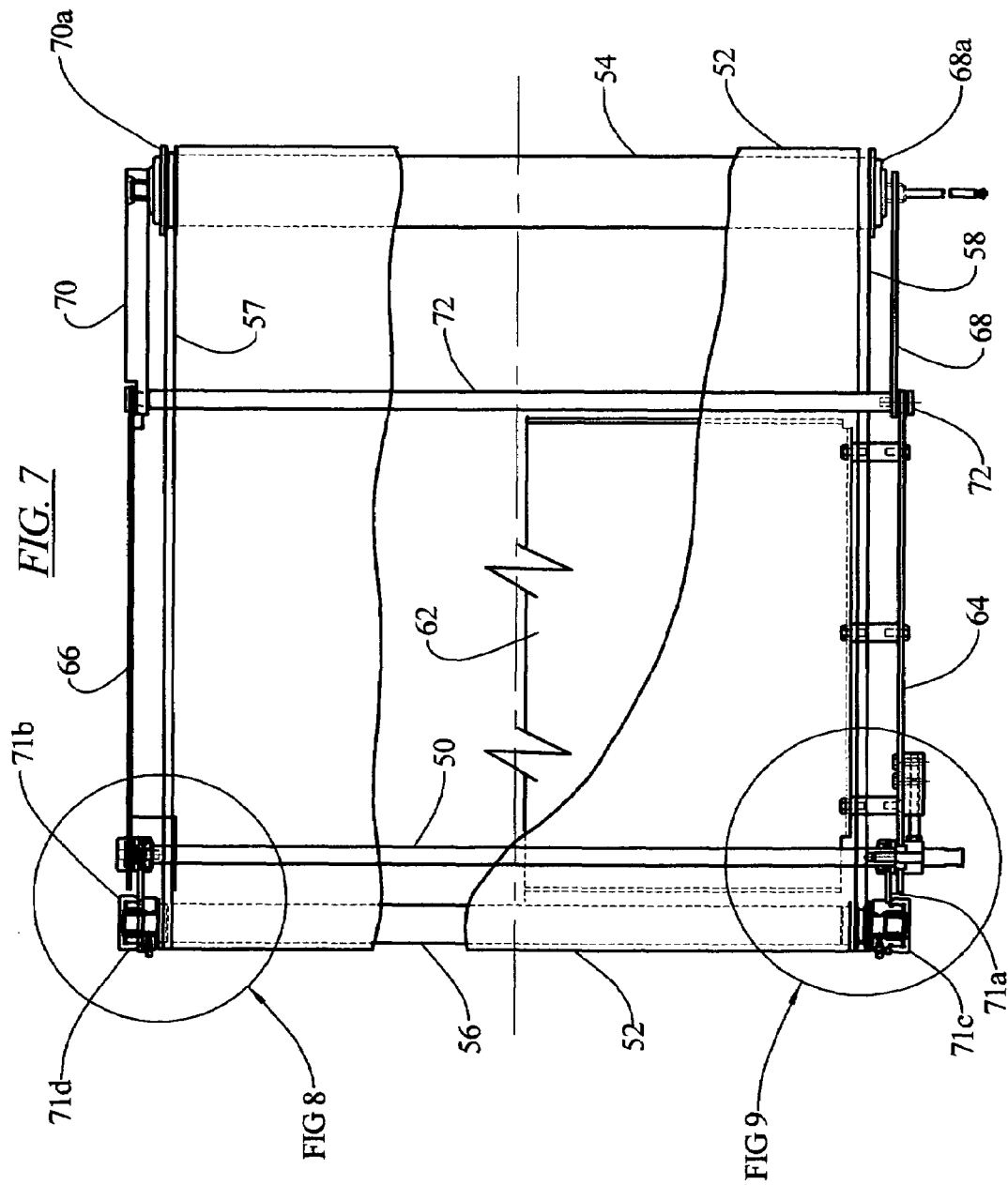
FIG. 7 is a top view of the patty pressing system of FIG. 4.
Figure 8:
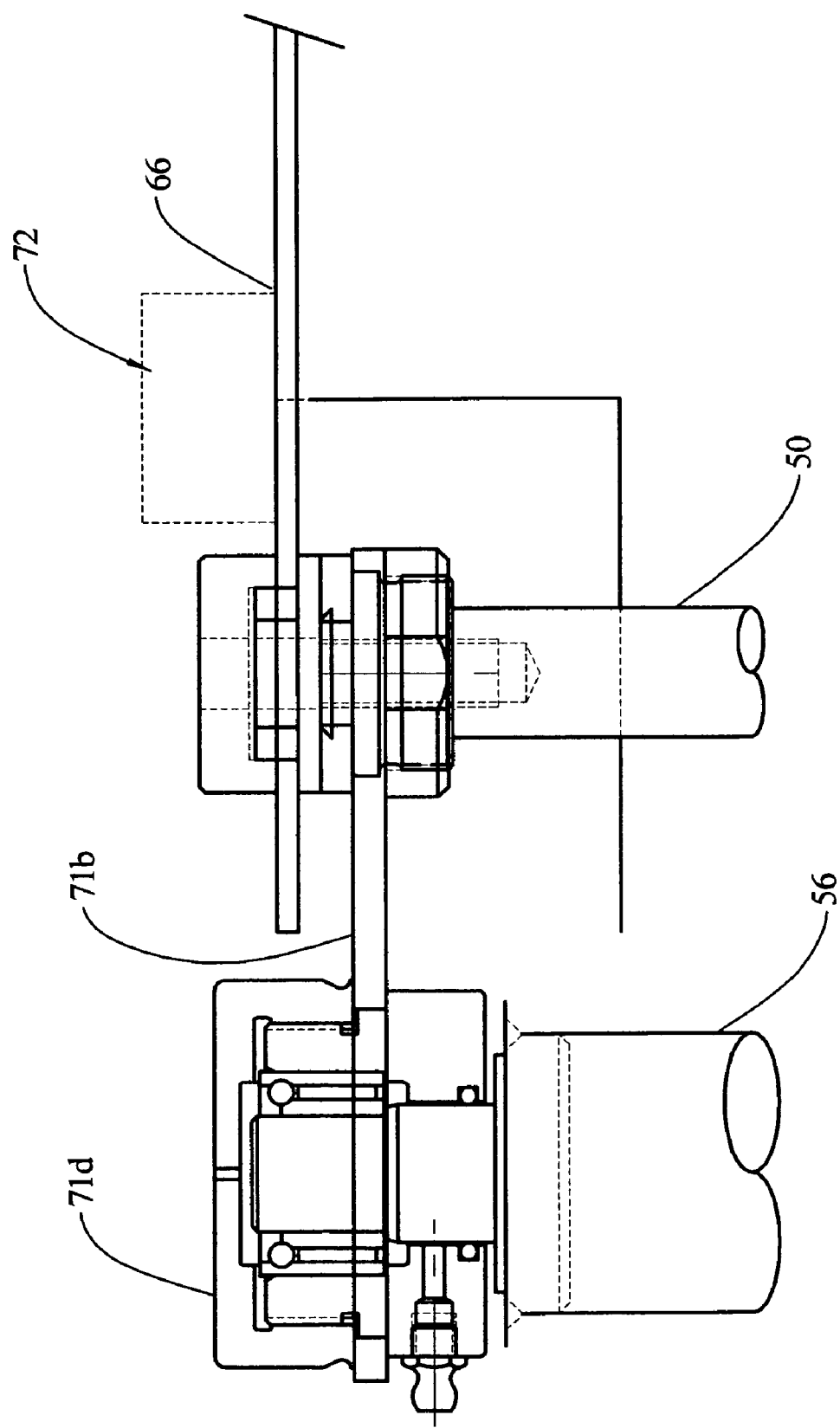
FIG. 8 is an enlarged, fragmentary view taken from FIG. 7.
Figure 9:
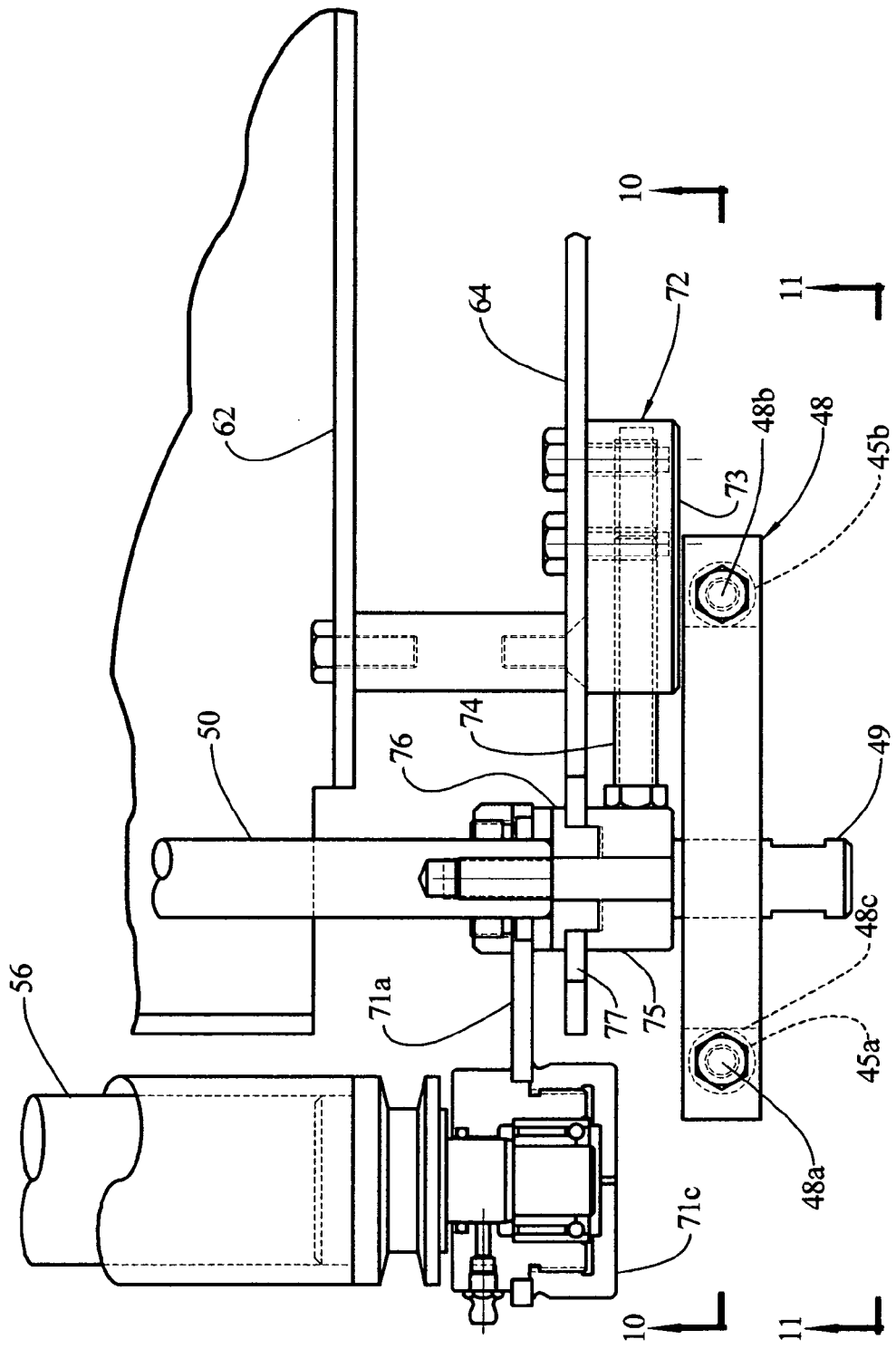
FIG. 9 is an enlarged, fragmentary view taken from FIG. 7.

As shown in FIGS. 3 and 5, a threaded shaft 45g is located between the columns 45a, 45b, off set inwardly and a threaded shaft 45h is located between the columns 45c, 45d, offset inwardly. A nut 45j is threaded onto the shaft 45g and a nut 45k is threaded onto the shaft 45h. The nuts 45j, 45k are fixed to the bracket plate 45e by keys, or fasteners, or by welding, etc. The nuts 45*j*, 45*k* cannot rotate or translate with respect to the bracket plate 45*e*.

The threaded shafts 45*g*, 45*h* are each connected to a first bevel gear 45*n*, 45*o*. The first bevel gears 45*n*, 45*o* are each enmesh with a second bevel gear 45*p*, 45*q* that are fixedly carried on a crank shaft 45*r*. The crank shaft 45*r* is journaled on bearings 45*s*, 45*t* on the frame. A crank handle 45*u*, 45*v* is fixed onto opposite ends of the crank shaft 45*r*. Thus by turning either of the crank handles 45*u*, 45*v*, the nuts 45*j*, 45*k* progress up or down the shafts 45*g*, 45*h*. The nuts drive the bracket plate 45*e* up or down which drives the columns 45*a*-45*d* up or down.

Upper parts of the columns 45*a*-45*d* of the elevator mechanism 45 are fastened to a block 48 by two fasteners 48*a*, 48*b*. A pin 49 is connected to a strut 50 that spans the input section 41*a*, and is connected to the sidewalls 64, 66. The pin 49 is fit within a slot 48*c* within the block 48 so that as the elevation is adjusted, the pin 49 can slide, as necessary, in the slot 48*c*. Adjusting the elevation of the inlet ends changes the tilt of the input section.

Each of the columns 45*a*-45*d* is guided above the bracket plate 45*e* by a guide 46 to allow vertical movement only. The guides 46 are mounted to a sidewall 40*aa* of the upper frame level 40*a*.

Bracket plate 45*e* is also guided by four support columns: support columns 45*aa*, 45*bb* on the near side of the presser 24 (FIG. 3), and support columns 45*cc*, 45*dd* on the far side of the presser 24 (FIG. 3, FIG. 5). The four support columns 45*aa*, 45*bb*, 45*cc*, 45*dd* are arranged in a rectangular grid pattern that is mirror image identical across a vertical, longitudinal center plane of the presser 24. Only the near side pair of support columns 45*aa*, 45*bb* is shown in FIG. 3 and FIG. 5 with the understanding that the far side pair of columns 45*cc*, 45*dd* is mirror image identical and that the four columns 45*aa*-45*dd* function identically.

Along the longitudinal direction, the threaded shaft 45*g* is between the support columns 45*aa*, 45*bb* and the threaded shaft 45*h* is between the support columns 45*cc*, 45*dd*.

Bracket plate 45*e* is guided for vertical movement by the support columns 45*aa*-45*dd* penetrating corresponding holes in the bracket plate 45*e* that are each fitted with a cylindrical bushing 45 for smooth, precise vertical movement of the bracket plate 45*e*. The near side columns 45*aa*, 45*bb* are mounted to the sidewall 40*aa* of the upper frame level 40*a* and to a bottom plate 40*bb* of the intermediate frame level 40*b*, via a mounting block 45*ee* attached with screws 45*ff* through a spacer 45*gg*. The far side columns 45*cc*, 45*dd* are mounted to a far side sidewall of the upper frame level 40*a*, and to the bottom plate 40*bb* of the intermediate frame level 40*b* in an identical fashion as the near side support columns.

The patty presser 24 includes an endless belt 52 that surrounds a drive roller 54 and a driven roller 56. The drive roller 54 is preferably a drum motor, such as a drum motor provided by ITOH DENKI. Alternately, the drive roller could be driven by a chain or belt from a dedicated motor of the motor that drives the output conveyor 39.

V-shaped guides 57, 58 on the inside surface of the belt 52 wrap end pulleys of the rollers 54, 56 to maintain the belt 52 in proper position on the rollers 54, 56. A backing plate 62 underlies the input section 41*a* of the presser 24. This plate 62 extends completely across the input section 41*a* and backs up the belt 52 and exerts a compression force of the patties as they are driven between the two conveyors 39, 41. The plate 62 is mounted to side panels 64, 66. The side panels 64, 66 are pivotally connected to side plates 68, 70 by a pivot axle 72. The driven roller 54 is rotationally held by and between the side plates 68, 70 by bearings 68*a*, 70*a*.

Figure 10:
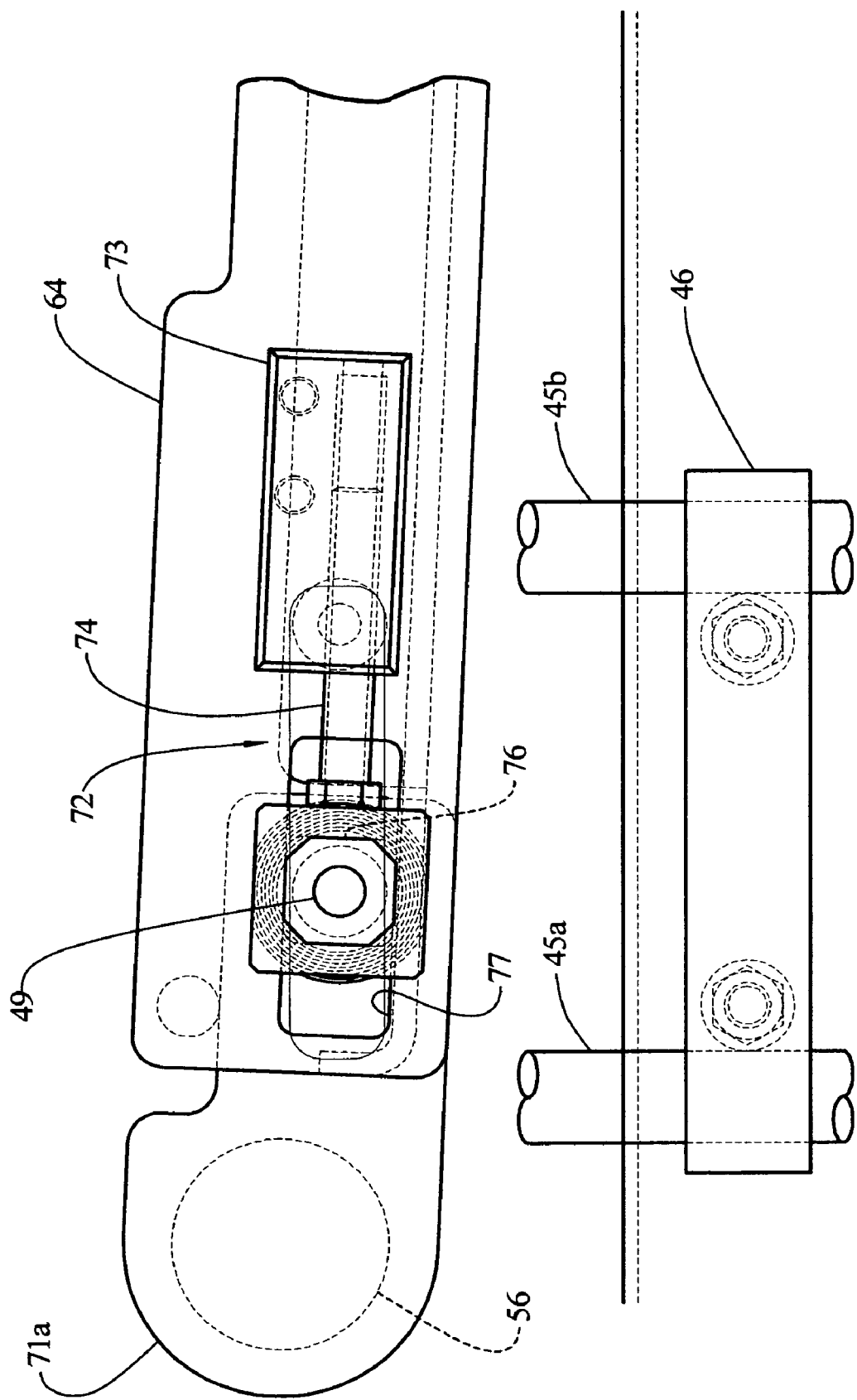
FIG. 10 is a sectional view taken generally along line 10-10 of FIG. 9.
Figure 11:
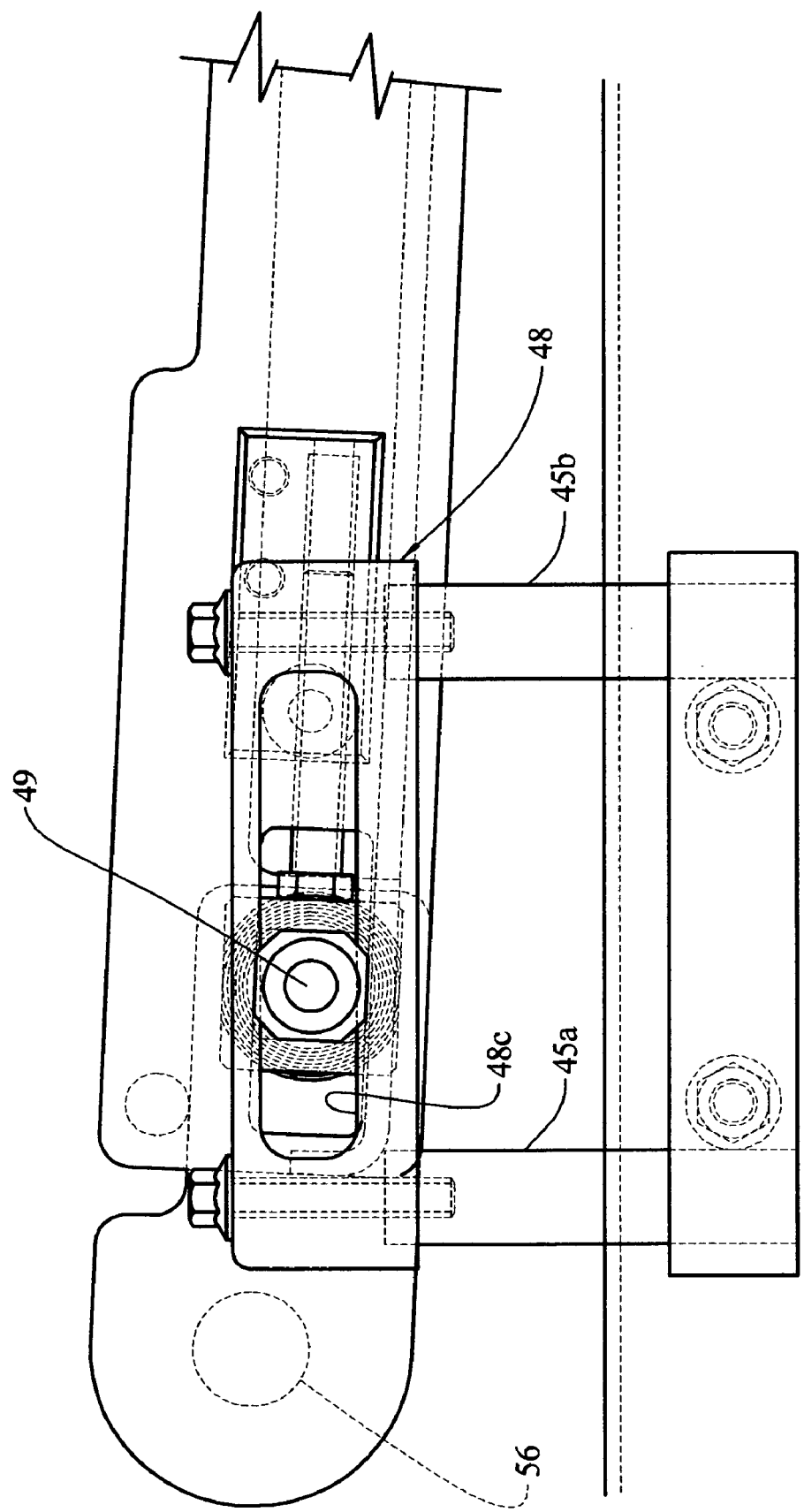
FIG. 11 is a sectional view taken generally along line 11-11 of FIG. 9.

The roller 56 is mounted for rotation on side plates 71*a*, 71*b* via bearings 71*c*, 70*d*. The side plates 71*a*, 71*b* are slidably mounted to the side panels 64, 66 by tensioning assemblies 72 (FIG. 10) that are arranged on opposite sides of the input section 41*a*. Each tensioning assembly 72 comprises an anchor 73 fastened to the sidewall 64, 66. A long bolt 74 is threaded into the anchor 73 and has its head butt against a block 75. The block 74 is connected to a slide block 76 by both being penetrated by the pin 49. The slide block 76 slides within a slot 77 in the sidewalls 64, 66. The side plates 71*a*, 71*b* are connected to the strut 50. Thus, extension of the bolt 74, 74 on both sides of the input section 41*a*, out of the respective anchor 73, 73 moves the side plates 71*a*, 71*b* out from the sidewalls 64, 66 to tension the belt 52 on the rollers 54, 56.

Upper parts of the columns 45*a*-45*d* of each of the elevator mechanisms 47 are fastened to a block 80 which is guided for straight vertical movement by a spindle 82. One block 80 is fastened to each of the respective side plates 68, 70. The driven roller 54 is rotationally held by and between the side plates 68, 70. Thus, elevating the block 80 elevates the side plates 68, 70 and the roller 54. Adjusting the elevation of the outlet section 41*b* also changes the elevation of the end of the input section 41*b* and also the final thickness of the patties.

The output conveyor belt 39*a* and the upper conveyor belt 54 circulate in opposite directions such that facing belt surfaces 54*a*, 39*b* travel in the same direction at the same general speed and form a patty pressing path 75 therebetween.

Figure 4:
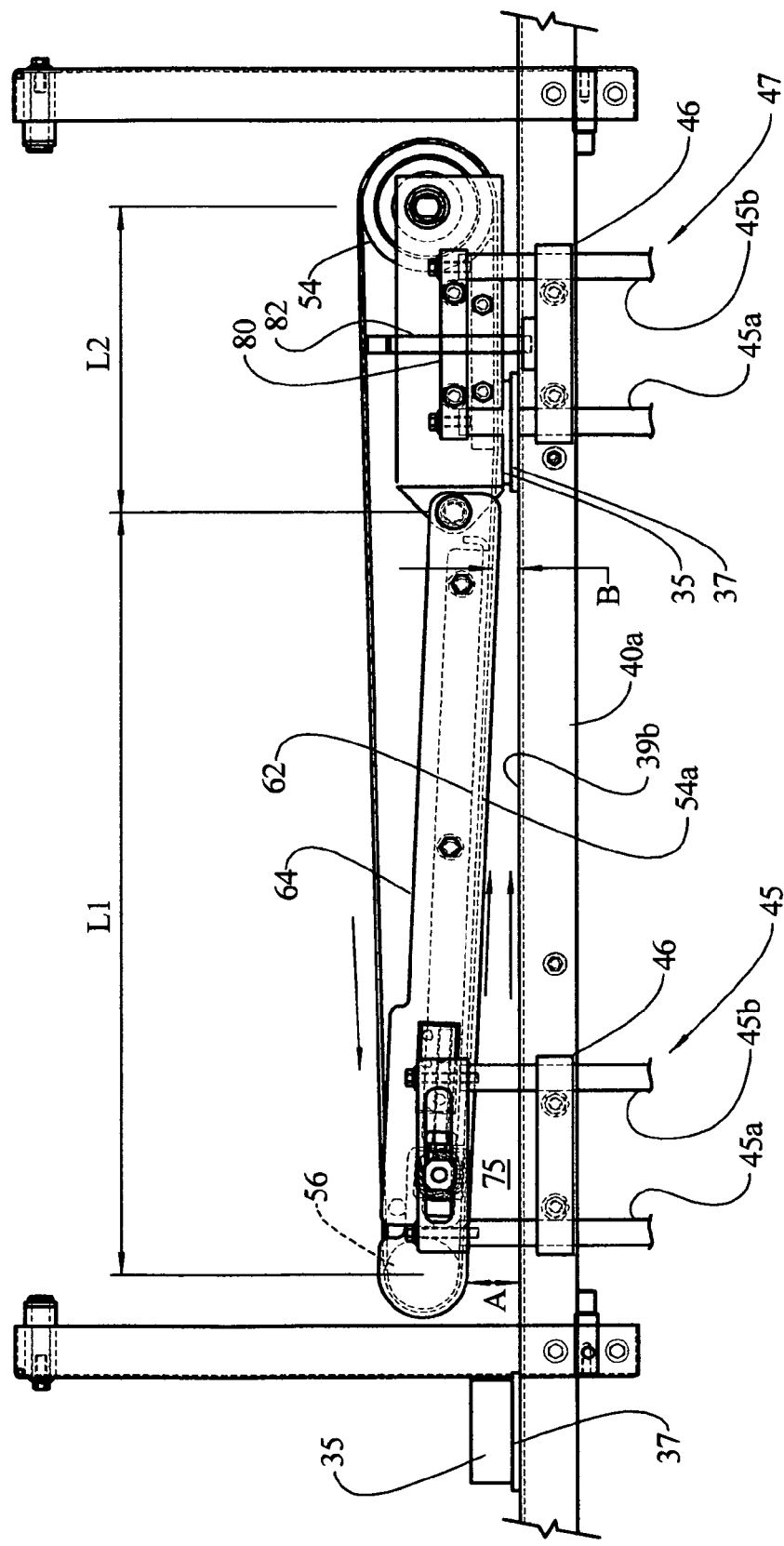
FIG. 4 is an enlarged, fragmentary side view taken from FIG. 2.
Figure 4A:
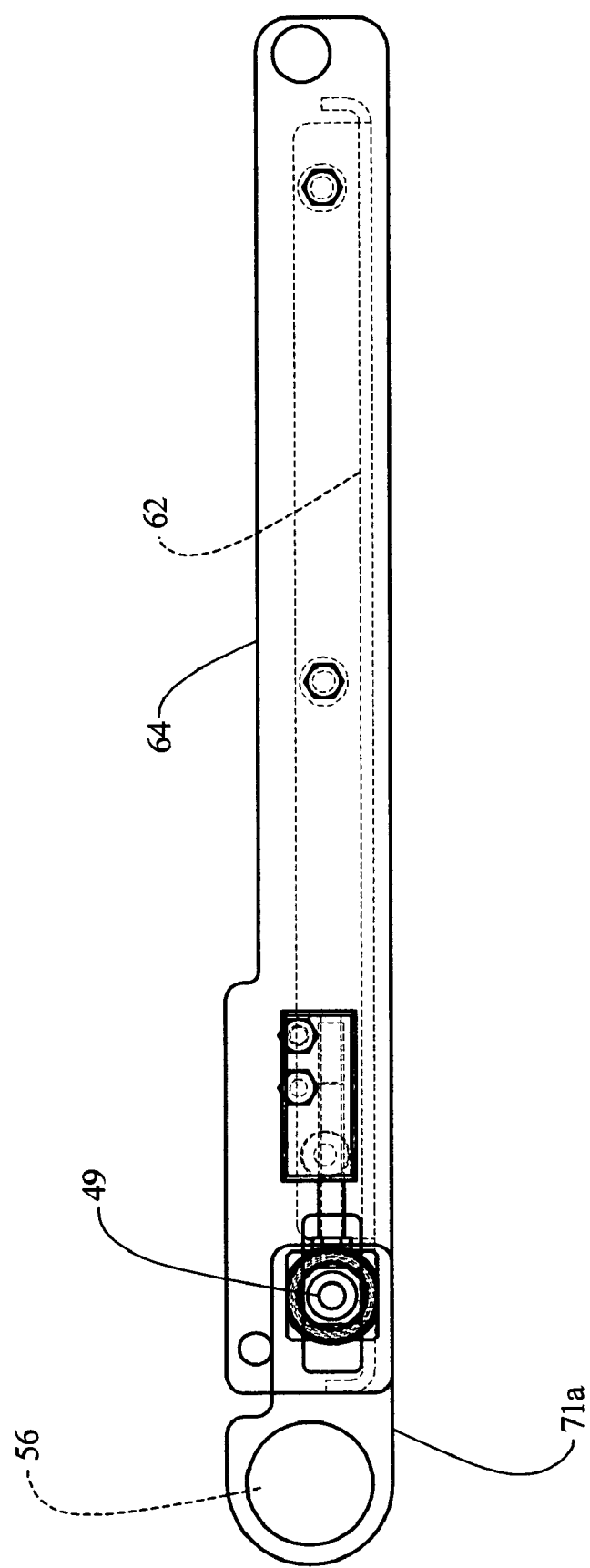
FIG. 4A is an enlarged view of a side of an input section of the patty pressing part of the system of the present invention.

As illustrated in FIG. 4, the clearance A between the facing surfaces 54*a*, 39*b* at the inlet of the path 75 is equal or greater to the height of the patty 35 plus sheet 37. The surface 54*a* declines along the path 75 in the input section 41*a* for a distance L1 to a clearance of B, squeezing the patty 35 down to approximately this height. The patty is then more gently squeezed in the last section of the path 75 corresponding to the horizontal section 41*b* for a distance L2. Due to this squeezing of the patty between the belts 54, 39*a*, the patty cracks and distorts around its edges, top and bottom surfaces to attain a hand-formed patty appearance.

According to one exemplary embodiment, L1=22 inches, L2=9 inches, A=1.5 inches and B=0.5 inches for a patty that has an initial diameter of 3 inches and a final diameter of 4.5 inches.

The shuttle conveyor 26 can be as described in U.S. Pat. No. 6,669,005 or 7,065,936, herein incorporated by reference. The shuttle conveyors in these patents are conveyors wherein the end of the circulating conveyor belt can be retracted or extended to deposit a patty into one or more rows onto a conveyor having a running direction arranged parallel to, or perpendicular to, the running direction of the shuttle conveyor. Also, the end of the shuttle conveyor is movable to ensure aligned stacking of the patty/sheet interleaved products.

The packaging machine 28 delivers empty packages, such as trays formed in a continuous train, to a fill station 28*a* beneath the end of the shuttle conveyor. Preferably, the trays are placed onto an endless belt conveyor 28*b* having spacing ribs or walls 28*c* at regularly spaced intervals that correspond to the patty output from the shuttle conveyor 26. The shuttle conveyor 26 can be controlled to stack interleaved patties and sheets continuously into the trays until the allotted number per tray is stacked in the tray. The trays are then indexed in synchronism with the shuttle conveyor and the rest of the equipment, to bring new empty trays into the filling station 28*a*. In this regard, the packaging machine 28 can be in signal-communication with the control of the patty-forming machine and shuttle conveyor.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A system for forming patties having a hand-formed appearance, comprising,
   a high speed patty forming machine having a reciprocating mold plate with mold cavities, said mold plate reciprocating between a patty fill position wherein food product under pressure fills said cavities and a discharge position where a plurality of knockout cups displace said patties from said cavities downward onto an output conveyor portion; and
   a patty presser comprising an upper conveyor having an upper endless belt and a lower conveyor comprising a lower endless belt,
   said lower conveyor receiving patties from said output conveyor portion, said upper conveyor located above said lower conveyor,
   facing belt surfaces of said upper and lower endless belts defining a path between said upper and lower conveyors,
   said upper and lower endless belts circulating in opposite directions,
   said upper conveyor having an inlet length of said facing belt surface of said upper endless belt being tilted such that a first clearance at an input to said path is equal to or greater than a thickness of said patties and a second clearance at an outlet of said inlet length is less than a thickness of said patties at said input of said path,
   the upper conveyor comprises an upstream roller and a downstream roller, the upper conveyor belt extending around at least a portion of the upstream and downstream rollers, the outlet of the inlet length is located downstream of the upstream roller; and
   said upper conveyor comprises a horizontal section from an end of said inlet length to the end of said path.

2. The system according to claim 1, further comprising a shuttle conveyor arranged at said output of said path and an indexing packaging machine that at a filling station presents open packages to be filled and once filled, indexes said packages away from said filling station to and delivers new open packages to said filling station, said shuttle conveyor delivering patties to said filling station.

3. The system according to claim 1, wherein the horizontal section is a parallel section, where the upper conveyor is parallel to the lower conveyor along the horizontal section.

4. The system according to claim 1, wherein said upper conveyor comprises a backing plate above said inlet length of said facing surface of said upper endless belt; the backing plate defining maximum vertical positions of said upper endless belt along at least a portion of the inlet length and configured to support the upper endless belt against the compression force of patties being moved through the patty presser.

5. The system according to claim 1, comprising a first elevator mechanism, wherein said inlet length of said upper endless belt is adjustable in tilt by action of said first elevator.

6. The system according to claim 5, comprising a second elevator mechanism, wherein said clearance between said facing belt surfaces at an end of said path is adjustable by action of said second elevator mechanism.

7. The system according to claim 1, wherein said output conveyor portion and said lower conveyor are formed by a single endless belt.

8. A patty presser, comprising:
   an upper conveyor having an upper endless belt and a lower conveyor comprising a lower endless belt, said lower conveyor receiving patties, said upper conveyor located above said lower conveyor, facing belt surfaces of said upper and lower endless belts defining a path between said upper and lower conveyors, said upper and lower endless belts circulating in opposite directions, said upper conveyor having an inlet length of said facing belt surface of said upper endless belt being tilted such that a first clearance at an input to said path is equal to or greater than a thickness of said patties and a second clearance at an outlet of said inlet length is less than a thickness of said patties at said input of said path;
   the upper conveyor comprises an upstream roller and a downstream roller, the upper conveyor belt extending around at least a portion of the upstream and downstream rollers, the outlet of the inlet length is located downstream of the upstream roller;
   said upper conveyor comprises a parallel section from an end of said inlet length to the end of said path, where the upper conveyor is parallel to the lower conveyor along the parallel section.

9. The presser according to claim 8, wherein the parallel section of the upper conveyor is a horizontal section.

10. The presser according to claim 8, wherein said upper conveyor comprises a backing plate above said inlet length of said facing surface of said upper endless belt, the backing plate defining maximum vertical positions of said upper endless belt along the inlet length and configured to support the upper endless belt against the compression force of patties being moved through the patty presser.

11. The system according to claim 1, wherein upper conveyor comprises a backing plate above said inlet length of said facing surface of said upper endless belt; the backing plate defines a declined linear portion of the inlet length when the upper belt is positioned against the backing plate.

12. The system of according to claim 1, wherein the upstream roller has a clearance location, the clearance location is the position on the roller where the roller surface is closest to the lower conveyor; the outlet of said inlet length is positioned downstream of the clearance location.

13. The system according to claim 8, wherein upper conveyor comprises a backing plate above said inlet length of said facing surface of said upper endless belt; the backing plate defines a declined linear portion of the inlet length when the upper belt is positioned against the backing plate.

14. The system of according to claim 8, wherein the upstream roller has a clearance location, the clearance location is the position on the roller where the roller surface is closest to the lower conveyor; the outlet of said inlet length is positioned downstream of the clearance location.

* * * * *